W. A. CHRYST.
ENGINE STARTING SYSTEM.
APPLICATION FILED JUNE 12, 1915.

1,226,751.

Patented May 22, 1917.

Witnesses
Walter W. Riedel
Joseph W. McDonald

Inventor
William A. Chryst
By Kerr, Page, Cooper & Hayward
Attorneys.

UNITED STATES PATENT OFFICE.

WILLIAM A. CHRYST, OF DAYTON, OHIO, ASSIGNOR TO THE DAYTON ENGINEERING LABORATORIES COMPANY, A CORPORATION OF OHIO.

ENGINE-STARTING SYSTEM.

1,226,751. Specification of Letters Patent. Patented May 22, 1917.

Application filed June 12, 1915. Serial No. 33,812.

*To all whom it may concern:*

Be it known that I, WILLIAM A. CHRYST, a citizen of the United States of America, residing at Dayton, county of Montgomery, and State of Ohio, have invented certain new and useful Improvements in Engine-Starting Systems, of which the following is a full, clear, and exact description.

This invention relates to engine starting devices, wherein a motor-generator is utilized for cranking the gas engine and when the engine is running, the motor-generator is operated as a generator to store power back in the batteries.

Devices of this general character are well known in the art, and the general object of the present improvements is to simplify the construction and mode of operation of the apparatus, as will be apparent from the ensuing description.

In the particular form adopted in the present case, the electric machine will be referred to for convenience as a motor-generator, since it operates as a motor for cranking the engine, and as a generator for the charging or current-delivery operation.

In the form adopted herein, the motor-generator is supported by a pivoted, in lieu of a fixed bearing, and is held in normal position by an impelling force, such as a spring. In such position, its shaft, connected with the engine shaft by means of a belt, is driven at the engine speed, as the belt, by means of the spring, is held sufficiently tight to transmit the power.

To start the engine, however, a lever or pedal is operated to impart movement to a suitable means for shifting the motor-generator about its pivotal bearing and thereby slacken the engine drive belt, and at the same time throw the motor-generator shaft into gear, frictional or otherwise, with the periphery of the fly wheel, or some other equivalent member of the engine train. By the same movement the circuit of the battery through the motor brushes is closed, whereby the motor-generator operating as a motor revolves the engine and enables it to become self-propelling. After such starting, the pedal is released, whereupon the engine drives the motor-generator as a generator through the then tightened belt, and the battery is charged or the lamps and igniter furnished with current, as the case may be.

This improvement I have illustrated in the drawings hereto annexed, in which—

Figure 1:
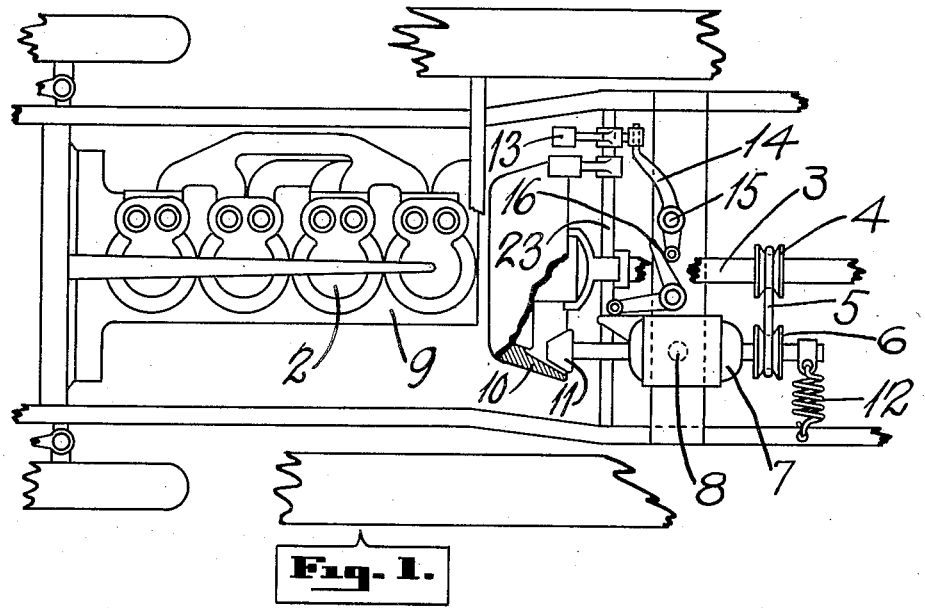
Figure 1 is a top plan view of a portion of a motor vehicle, showing my invention applied thereto.
Figure 2:
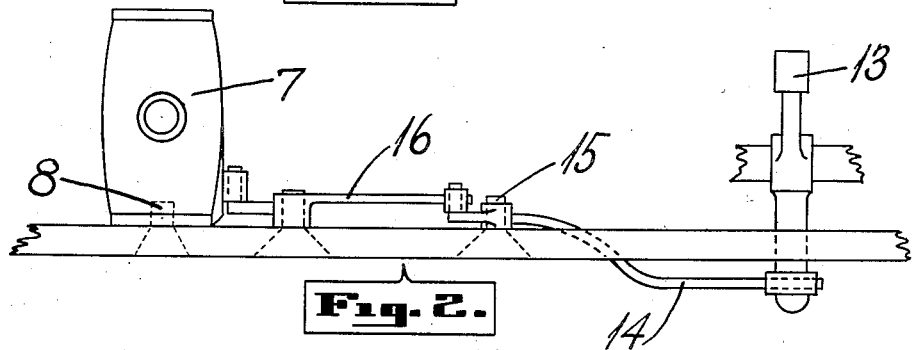
Fig. 2 is an enlarged end view of my improved starting mechanism.

The motor vehicle is operated by means of an engine the cylinders of which are designated by the numeral 2. The engine shaft 3 is suitably extended and carries a pulley 4 from which runs a belt 5, to the pulley 6 of a motor-generator 7, which is supported by pivotal bearings 8.

The fly wheel of the engine 9, has a flange 10 extending therefrom and a conical attachment 11 on the motor-generator shaft stands normally in close proximity to the inner rim of this flange.

The motor-generator is held in normal position and the belt 5 maintained taut by a spiral spring 12, secured to the frame of the vehicle and connected to the dynamo shaft.

The vehicle is provided with one or more pedals 13, on a suitable shaft, one of such pedals being arranged to turn, when depressed, a lever 14, about its pivotal bearing 15. The free end of the lever 14 engages with a bell crank lever 16, pivoted to the frame and carrying a roller at its end that is adapted to bear upon a projection from the motor-generator as shown.

The pedal lever on one side of the shaft 23 is formed with two spring actuated arms 17 and 18, provided with contacts 19, which when the pedal is depressed are brought into engagement to close a circuit between the two arms which are normally insulated from one another, which circuit includes the motor coils.

Figure 3:
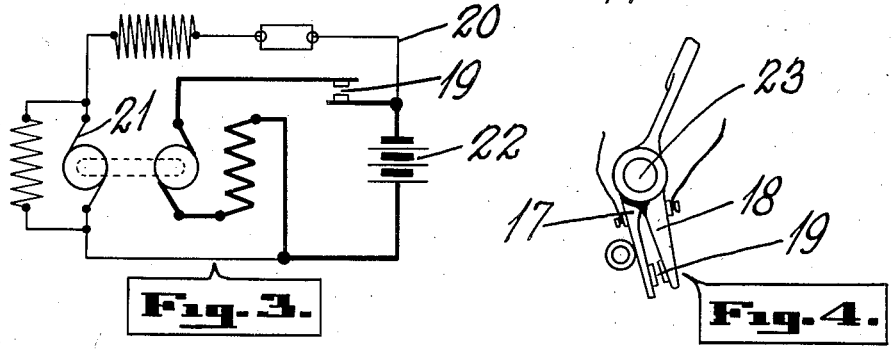
Fig. 3 is a diagrammatic view of the circuit connections of the system.
Figure 4:
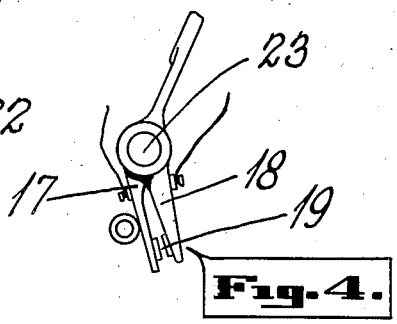
Fig. 4 is a detail view of a circuit closer, associated with the pedal.

In starting the vehicle, the pedal 13 is depressed, which results in a turning of the motor-generator about its pivotal support 8, which loosens the belt 5, and brings the conical end of the shaft 11 into frictional contact with the fly wheel. At the same time, the circuit to the motor-generator from the battery is closed at 19, see Fig. 3, and the motor-generator set in rotation. This starts the engine in movement and as soon as it becomes self-propelling, the pedal is raised, the motor-generator allowed to resume its normal position, the motor circuit broken, and the generator circuit through wires 20, and the generator brushes 21 is closed. Thereafter the motor-generator is run by the engine as a generator and charges the battery 22, or performs whatever other operations are required in machines of this character.

While the form of mechanism herein shown and described constitutes a preferred form of embodiment of the invention, it is to be understood that other forms might be adopted, all coming within the scope of the claims which follow.

What I claim is:

1. In an engine starting device, the combination with an engine, of a motor-generator pivotally supported adjacent to the engine; a plurality of means for connecting the engine and the motor-generator together, each of said means having different mechanical advantages; and means for shifting the position of the motor-generator on its pivotal support to connect the engine and motor-generator together through the different connections.

2. In an engine starting device, the combination with an engine, of a motor-generator having a shaft adapted to connect with the engine when the motor-generator is to operate as a motor for starting purposes; and a flexible connection between the engine and motor-generator, adapted to drive the motor-generator as a generator when the engine becomes self-actuating; means for pivotally supporting the motor-generator; and means for shifting the motor-generator on its pivotal support, whereby the motor-generator shaft will be moved into driving connection with the engine and the flexible connection will be so loosened as to discontinue its driving effect.

3. In an engine starting device, the combination with an engine having a flywheel; of a motor-generator pivotally supported adjacent to the engine, said motor-generator having a shaft adapted to be brought into contact with the engine flywheel when the motor-generator is to operate as a motor for starting purposes; a belt connection between the motor-generator and the engine and adapted to drive the motor-generator as a generator when the engine becomes self-actuating; and means for turning the motor-generator on its pivotal support to loosen the belt connection and to bring its shaft connection into engagement with the engine flywheel for starting purposes.

4. In an engine starting device, the combination with an engine having a flywheel; of a motor-generator pivotally supported adjacent to said engine, said motor-generator having a shaft adapted to be brought into engagement with the flywheel of the engine, when the motor-generator is to operate as a motor for starting purposes; a belt connection between the engine and the motor-generator for driving the motor-generator as a generator when the engine becomes self-actuating; an operating element; and connections between the operating element and the motor-generator, whereby said motor-generator may be shifted to loosen the belt connection between the engine and the motor-generator and to bring the shaft of the motor-generator into engagement with the flywheel for starting purposes.

5. In an engine starting device, the combination with an engine, of a motor-generator pivotally mounted adjacent to said engine; means for connecting the motor-generator to the engine when the motor-generator is to operate as a motor for cranking purposes; flexible means for connecting the motor-generator to the engine when the motor-generator is to operate as a generator; and an operating element for shifting the motor-generator on its pivotal mounting to make the connection between the motor-generator and the engine for cranking purposes.

In testimony whereof I affix my signature in the presence of two subscribing witnesses.

WILLIAM A. CHRYST.

Witnesses:
J. W. McDONALD,
O. D. MOWRY.